Dec. 11, 1951 L. H. MOOMAW 2,578,082
MOTION-PICTURE PROJECTOR TRANSMISSION
Original Filed Oct. 17, 1946 2 SHEETS—SHEET 1

INVENTOR
LEWIS H. MOOMAW
BY
ATTORNEY

Dec. 11, 1951      L. H. MOOMAW      2,578,082

MOTION-PICTURE PROJECTOR TRANSMISSION

Original Filed Oct. 17, 1946      2 SHEETS—SHEET 2

INVENTOR
LEWIS H. MOOMAW
BY
ATTORNEY

Patented Dec. 11, 1951

2,578,082

UNITED STATES PATENT OFFICE 2,578,082

MOTION-PICTURE PROJECTOR TRANSMISSION

Lewis H. Moomaw, Great Neck, N. Y., assignor to De Jur-Amsco Corporation, Long Island City, N. Y., a corporation of New York Original application October 17, 1946, Serial No. 703,808. Divided and this application September 23, 1947, Serial No. 775,657

3 Claims. (Cl. 74—206).

This invention relates to a motion picture projector transmission connecting the driving motor of said projector with the projector machinery.

In the operation of motion picture projectors, and particularly in motion picture projectors designed for home use, it is often desired to stop the motion of the film in the projector and project a single frame of that film. To this end, means must be provided for disconnecting the projection machinery from its driven relationship to the motor. Many such transmission means have been provided in the past, but they suffer from such disadvantages as complexity of structure, necessity for employing external belt drives, and non-reversibility of functioning.

It is the primary object of the present invention to devise a motion picture projector transmission which, when engaged, is capable of transmitting motion of the driving motor in both directions and which may be simply disengaged to permit still projection.

It is another object of the present invention to devise such a transmission construction which is compact and simply constructed, thus not only decreasing its cost of fabrication, but increasing its dependability.

Yet another object of the present invention is to devise such a motion picture projector transmission which employs a pair of transmission elements so arranged with relation to the remainder of the driving structure of the projector that one of said elements makes up the primary driving element for one direction of rotation of the projector motor and the other of said elements makes up the primary driving element for the other direction of rotation thereof, yet in which both of said elements cooperate and assist one another for either direction of rotation.

A more specific object of the present invention is to devise a transmission structure employing, between a driving and a driven pulley, a pair of friction pulleys, one on each side of the driving and driven pulleys, so that rotation of the driving pulley in either direction will be efficiently transmitted to the driven pulley.

To the accomplishment of the foregoing objects and such other objects as may hereinafter appear, the present invention relates to the motion picture projector transmission construction as defined in the appended claims and as set forth in this specification, taken together with the accompanying drawings, in which:

Figures 1, 2:
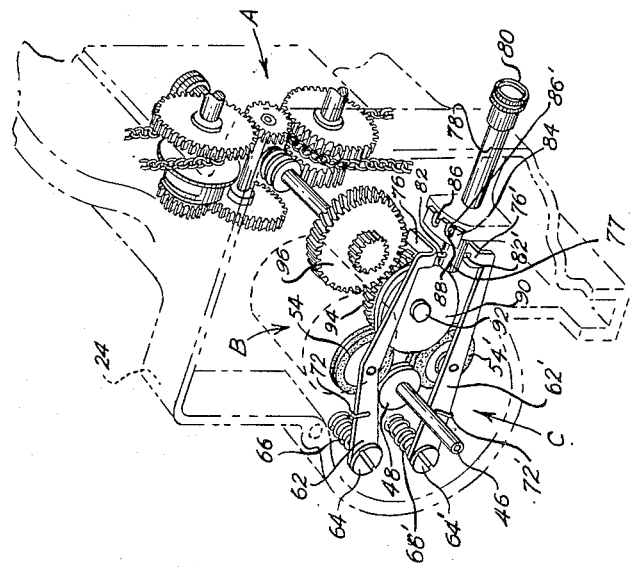
Fig. 1 is a three-quarter rear perspective view of a projector embodying the features of my invention.
Fig. 2 is a schematic view of the transmission system.
Figure 3:
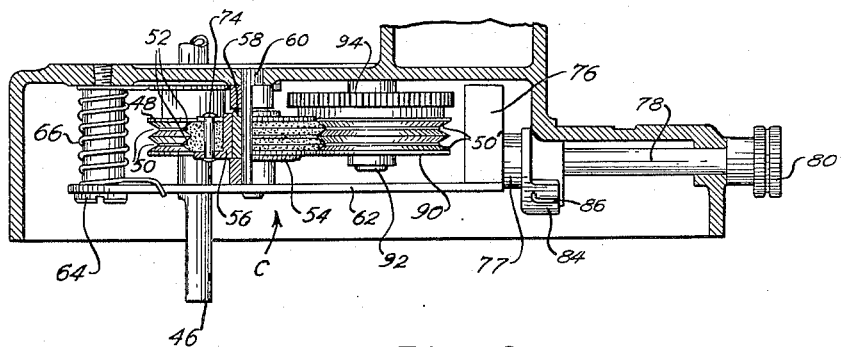
Fig. 3 is a view taken along the line 3—3 of Fig. 4.

This application is a division of my previously filed application, Ser. No. 703,808, filed October 17, 1946, and entitled "Motion Picture Projector," now Patent No. 2,468,993. My invention is here described as embodied in an 8 millimeter home projector, other features of which are described with more particularity in the parent case to this application and in my other co-pending applications, Ser. No. 703,805, filed October 17, 1946, entitled "Ventilation System for Motion Picture Projector," now Patent 2,440,966; Ser. No. 703,806, filed October 17, 1946, entitled "Hinged Aperture Gate," now Patent 2,495,018; and Ser. No. 703,807, filed October 17, 1946, entitled "Projection and Rewinding System for Motion Picture Projector." It is to be understood, however, that my invention is not confined specifically to such a projector.

Insofar as the present invention is concerned, my projector may be taken as comprising projection machinery generally designated A adapted to be driven by a motor B. The manually operable transmission means C which forms the subject matter of this invention is interposed between the motor B and the projection machinery A so that the projection machinery may be stopped to permit still projection while the motor B continues to rotate. The transmission means C is so constructed that when the projection machinery A is disconnected from the motor B, the reduction of load on the motor B causes it to rotate more rapidly, whereby the ventilating means, commonly provided in the projector and driven by the motor B, may be operated more rapidly, an increased ventilating effect being thereby obtained so that the film and the projector is subjected to an increased cooling effect at the very time that the cooling effect is most needed, to wit, when the film is stationary.

Described more specifically, my projector comprises a base 2 in which are housed the various electrical control circuits for the projector, those circuits comprising an illumination circuit for the lamp (not shown), controlled by switch 4, a start and stop circuit for the motor B, controlled by switch 6, and a reversing switch for the motor B, controlled by switch 8. Knob 10 may control a rheostat in the motor circuit so as to control within limits the speed of rotation thereof and consequently the speed of projection. Electrical connection is made to these circuits by means of the contact pins 12. The projector housing proper, generally designated 14, is mounted on the base 2 in such a manner as to be tiltable with respect thereto so as to control the position of the projected image, the knob 16 on the base 2 controlling the tilt.

The housing 14 comprises a fan housing 18 provided with air inlet orifices 20 in which is disposed a ventilating fan (not shown), a lamp housing 22 in which is disposed an illumination lamp (not shown), a motor housing in line with the fan housing 18 in which is disposed a motor B, shown in phantom in Fig. 2, a projection machinery housing 24, a gear box housing 26, a pair of reel supports 28 and 30 rotatably mounted at the extremities of reel arms 32 and 34, conventional sprocket assemblies 36 and 38 for guiding the film, and a gate 40 hingedly attached to the housing 14 by piano hinge 42 and carrying a lens assembly 44 for properly directing and focusing the projected image. All of the above elements may be, except as hereinafter specifically described, of conventional construction insofar as this invention is concerned. Details of various features thereof not more specifically described herein may be found in my co-pending applications for Letters Patent enumerated above.

The source of motion for all of the moving parts of my projector is a single motor B, to the drive shaft 46 of which is connected a driving pulley 48. The driving pulley 48 is here shown as provided with a pair of tapered circumferential grooves 50 (see Fig. 4), into which the mating circumferential projections 52 of each of the two friction pulleys 54 and 54' are adapted to project.

Each of the friction pulleys 54 and 54' comprises a hub 56 press-fitted over bushing 58 which is freely rotatable on shaft 60, itself in turn carried by arm 62 which is pivotable about screw 64 suitably attached to the projection machinery housing 24. The body of helical spring 66 is wrapped around the screw 64, one end 68 thereof being suitably secured to the frame 24 as by screw 70 and the other end 72 thereof exerting pressure upon the arm 62 in such a direction as to force the friction pulley 54 into contact with the driving pulley 48.

Secured to the hub 56 by means of screw rivet 74 is a body of frictional material such as cork or rubber, the pheripheral edges of which are provided with the circumferential projections 52. The force exerted by the spring 66 is sufficient to ensure that the friction between the driving pulley 48 and the friction pulleys 54 and 54' will be of sufficient magnitude so that the former will drive the latter.

The extremities of the arms 62 and 62' terminate in ledges or lugs 76 and 76'. Rotatably mounted in the housing 24 so that its projecting extremity 77 is interposed between the ledges or lugs 76 and 76' of the arms 62 and 62' is shaft 78, the other end of which projects out through the wall of the housing 24 and has attached thereto a manually operable actuating knob 80. The end 77 of the shaft 78 which is interposed between ledges or lugs 76 and 76' has disposed thereon, in the form here disclosed, a pair of radially projecting pins 82, 82', the projecting lengths of which are sufficient so that when they are disposed perpendicular to the ledges or lugs 76 and 76', they will spread the arms 62, 62' against the action of the springs 66, 66', thus moving the friction pulleys 54 and 54' out of contact with the driving pulley 48. This position is illustrated in Fig. 2. It will be understood that the end 77 of shaft 78 interposed between the ledges or lugs 76, 76' may be of a different shape from that specifically disclosed and still attain the desired functioning.

The shaft 78 may also carry a shell 84 provided with a pair of notches 86, 86' which cooperate with a spring-loaded detent 88 mounted in the housing 24 in order to ensure positive positioning of the shaft 78 and the pins 82, 82' between a position in which said pins do not make contact with the ledges or lugs 76, 76' and a position in which such contact is made and the arms 62, 62' are thereby spread apart. (Compare Figs. 2 and 4.)

A driven pulley 90, similar in construction to the driving pulley 48 but optionally differing therefrom in size, is mounted in the housing 24 so as to be rotatable about a shaft 92. The tapered circumferential groove 50' of the driven pulley 90 are located in line with the similar grooves 50 of the driving pulley 48 and with the frictional circumferential projections 52 of the friction pulleys 54 and 54' so that when the springs 66 and 66' urge the friction pulleys 54 and 54' into frictional contact with the driving pulley 48, similar contact is simultaneously ensured between said friction pulleys and the driven pulley 90, by which means rotation of the driving pulley 48 is transmitted thereto.

Gear 94 carried by the driven pulley 90 meshes with and drives gear 96 which in turn drives the projection machinery A. Since positive gearing connection exists between the driven pulley 90 and the other rotating parts of the projector, which parts control the rotation of the reel supports 28 and 30 and the sprocket assemblies 36 and 38 in a manner which forms no part of the present invention, but which is set forth in detail in the previously mentioned patent application Serial No. 703,807, it will be apparent that when the friction pulleys 54 and 54' make contact between the driving pulley 48 and the driven pulley 90, the film in the projector will be caused to move until, by rotation of the knob 80, the pins 82, 82' in conjunction with the ledges or lugs 76 and 76' move the friction pulleys 54 and 54', away from frictional connection with the driving pulley 48 and the driven pulley 90, at which time motion of the film through the projector will cease. It is therefore apparent that the friction pulleys 54 and 54' and the means by which they are mounted in the projector comprise the transmission means C which may be positively actuated by the rotation of the knob 80 through but a small angle so as to disconnect the projection machinery A from the driving pulley 48.

It will be noted that the two friction pulleys 54 and 54' are located on opposite sides of the driving pulley 48 and the driven pulley 90. More specifically, the axes of shafts 46 and 92, about which the driving puley 48 and the driven pulley 90 rotate, are parallel, and the axes of rotation of the shafts 60 and 60', about which the friction pulleys 54 and 54' rotate, are parallel thereto but disposed on opposite sides of a line joining the axes of rotation of the shafts 46 and 92. The springs 66 and 66' urge the friction pulleys 54 and 54' toward this imaginary line between the shafts 46 and 92, the friction pulleys 54 and 54' being thereby urged into frictional connection with the driving pulley 48 and the driven pulley 90.

Figure 4:
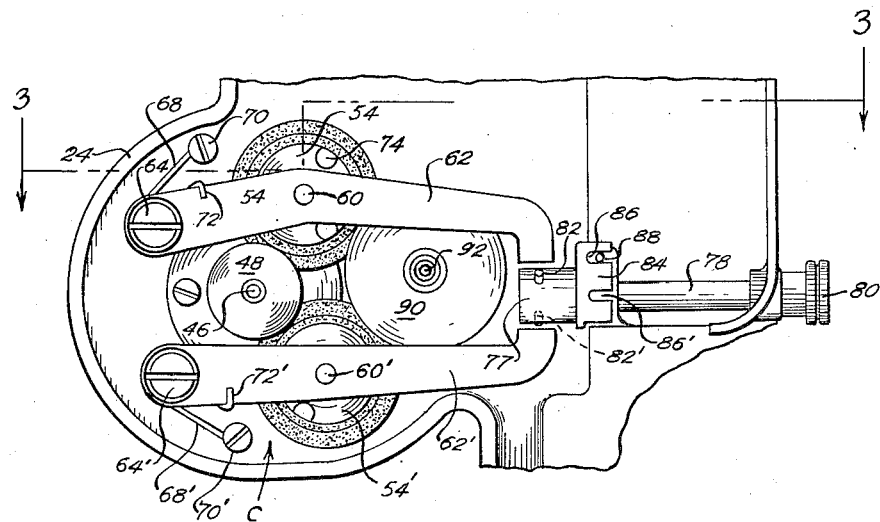
Fig. 4 is a view taken along the line 2—2 of Fig. 1 but showing only the transmission as herein embodied.

Having reference to Fig. 4, and assuming that the driving pulley 48 is rotated in a clockwise direction by the motor B, it will be apparent that the friction pulley 54 will play the primary part in the transmission of motion of the driving pulley 48 to the driven pulley 90 because the interengagement between the driving pulley 48 and the friction pulley 54 is such as to urge the friction pulley 54 into closer frictional engagement with the driving pulley 48. By the same token, the clockwise rotation of the driving pulley 48 will tend to urge the friction pulley 54' out of frictional engagement therewith and consequently the friction pulley 54' will only play a minor role in the transmission of rotation to the driven pulley 90. However, if the direction of rotation of the driving pulley 48 be reversed, the functioning of the friction pulleys 54 and 54' will be reversed, the friction pulley 54' bearing the brunt of the load and the friction pulley 54 bearing only a minor portion thereof.

By means of the herein set forth construction, a transmission is therefore provided which operates with equal facility no matter what the direction of rotation of the motor B. Two transmission elements in the form of friction pulleys 54 and 54' are employed, both of which function, for any given direction rotation of the motor B, to transmit that rotation to the projection machinery A, although their contributions are unequal when compared to one another. One takes the brunt of the load for one direction of rotation of the motor B and the other carries the burden when the motor B rotates in the opposite direction. A single manually operable actuated member in the form of a knob 80 effects simultaneous disengagement of both friction pulleys 54 and 54', thus stopping the projection machinery A no matter what the direction of rotation of the motor B.

Although that transmission construction is here disclosed in a specific embodiment, it will be apparent that many changes may be made in the specific details thereof without departing from the spirit of the invention as set forth in the following claims.

I claim:

1. In a motion picture projector, a housing, a motor and a driving pulley rotated thereby about an axis of rotation, a driven pulley connected to the projection machinery of the projector and rotatable about an axis of rotation parallel to that of the driving pulley, a pair of arms mounted in said housing so as to be pivotable about an axis parallel to said axes of rotation, each of said arms carrying a friction pulley mounted thereon so as to be rotatable about an axis of rotation parallel to those of the driving and driven pulleys, one of said pulleys being positioned on one side and the other on the other side of a line between the axes of rotation of the driving and driven pulleys, a lug on each of said arms and a rotatable member interposed between said lugs and adapted, in a first position, to permit said arms to assume a position in which the friction pulleys carried thereby make contact with and connect the driving and driven pulleys and, in a second position, to engage said lugs and cause said arms to diverge to a position in which the friction pulleys carried thereby do not make contact with both the driving and driven pulleys.

2. The combination of claim 1, in which said rotatable member is provided with a hub having spaced projections thereon, said projections being engageable with the lugs on said arms when said rotatable member is in its second position and being removed from contact with the lugs on said arms when said rotatable member is in its first position.

3. The combination of claim 1, in which said rotatable member is provided with detent means for retaining it in either its first or its second position.

LEWIS H. MOOMAW.

REFERENCES CITED

The following references are of record in the file of this patent:

UNITED STATES PATENTS

| Number | Name | Date |
| --- | --- | --- |
| 586,399 | Ryder | July 13, 1897 |
| 2,264,620 | Conrad | Dec. 2, 1941 |

FOREIGN PATENTS

| Number | Country | Date |
| --- | --- | --- |
| 13,567 | Great Britain | 1886 |
| 24,457 | Great Britain | Nov. 1, 1906 |
| 57,396 | Denmark | Mar. 18, 1940 |